United States Patent
Goodman (10) Patent No.: US 9,022,704 B1
(45) Date of Patent: *May 5, 2015

(54) MICROMETER CASE MOUTH CHAMFER TOOL

(71) Applicant: Larry Goodman, Cerritos, CA (US)

(72) Inventor: Larry Goodman, Cerritos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/474,557

(22) Filed: Sep. 2, 2014

Related U.S. Application Data (63) Continuation-in-part of application No. 14/067,531, filed on Oct. 30, 2013, now Pat. No. 8,827,607.

(51) Int. Cl.
  *B23B 5/16* (2006.01)
  *B23B 51/10* (2006.01)
  *F42B 33/10* (2006.01)
  *B23B 35/00* (2006.01)

(52) U.S. Cl.
  CPC .............. *B23B 51/103* (2013.01); *F42B 33/10* (2013.01); *B23B 35/00* (2013.01); *B23B 2251/50* (2013.01); *B23B 2251/54* (2013.01); *B23B 5/168* (2013.01); *Y10T 82/22* (2015.01)

(58) Field of Classification Search
  CPC ........ B23B 5/168; B23B 5/167; Y10T 82/22; F42B 33/10
  USPC ................. 409/131, 138–140, 206, 210, 214; 86/19.7, 24; 82/113, 128; 408/1 R, 72 R, 408/97, 110, 181–185
  See application file for complete search history.

(56) References Cited

U.S. PATENT DOCUMENTS

| 433,615 | A |   | 8/1890  | Brown |
|---------|---|---|---------|-------|
| 1,153,673 | A | * | 9/1915 | Bryant ........................ 279/6 |
| 2,302,869 | A | * | 11/1942 | Jewell ....................... 279/6 |
| 2,398,491 | A | * | 4/1946 | Bell ......................... 408/181 |
| 2,402,650 | A | * | 6/1946 | Maffia ....................... 407/68 |
| 3,069,932 | A | * | 12/1962 | Sweeny et al. .............. 408/185 |
| 3,174,390 | A | * | 3/1965 | Jacobsen ..................... 86/24 |
| 3,199,168 | A | * | 8/1965 | Rhine ....................... 86/19.7 |
| 3,234,974 | A |   | 2/1966 | Ray |
| 3,274,661 | A |   | 9/1966 | Westbrook |
| 3,304,597 | A | * | 2/1967 | Kezran ..................... 408/196 |
| 3,324,529 | A | * | 6/1967 | McCreery .................. 407/74 |
| 3,818,563 | A |   | 6/1974 | Beaulieu |
| 3,875,831 | A | * | 4/1975 | Beauloye .................. 82/113 |
| 3,999,452 | A | * | 12/1976 | Larsen ..................... 82/113 |
| 4,135,846 | A | * | 1/1979 | Nowakowski ............ 408/183 |

(Continued)

FOREIGN PATENT DOCUMENTS

| CH |   561576 | A | * | 5/1975 |
| DE |  2736819 | A | * | 2/1978 |
| SU |  1351706 | A | * | 11/1987 |

*Primary Examiner* — Daniel Howell
(74) *Attorney, Agent, or Firm* — Kenneth L. Green; Averill & Green (57) ABSTRACT

A case mouth chamfer tool utilizes an easily adjustable cutter holder member. The adjustable cutter holder member slides in a dovetail, is adjusted by advancing and retreating a screw, and is held in place by a set screw. The case mouth chamfer tool may be fixed to a micrometer dial threadedly engaging a barrel. A case adapter bearing is fixed to the barrel. The case mouth chamfer tool is adjusted to cut an inside chamfer and the micrometer dial is rotated to adjust the position of the case mouth chamfer tool with respect to the case adapter bearing to precisely adjust the amount of material cut from the case. The case adapter bearing is easily changed to chamfer different cases.

18 Claims, 8 Drawing Sheets

(56) References Cited

U.S. PATENT DOCUMENTS

| | | | |
|---|---|---|---|
| 4,486,131 A * | 12/1984 | Eckle | 408/185 |
| 4,742,606 A | 5/1988 | Burby et al. | |
| 4,813,827 A | 3/1989 | Dugger | |
| 5,054,970 A * | 10/1991 | Steiner | 408/146 |
| 5,076,122 A * | 12/1991 | Katzenburger et al. | 82/113 |
| 5,309,813 A | 5/1994 | Henley | |
| 5,758,996 A | 6/1998 | Loudon | |
| 6,101,915 A * | 8/2000 | Sinclair | 86/24 |
| 6,484,616 B1 * | 11/2002 | Giraud | 86/19.7 |
| 6,957,936 B2 * | 10/2005 | Kress | 408/181 |
| 8,408,112 B2 | 4/2013 | Keska | |
| 8,827,607 B1 * | 9/2014 | Goodman | 409/131 |

\* cited by examiner

MICROMETER CASE MOUTH CHAMFER TOOL

CROSS-REFERENCE TO RELATED APPLICATIONS

The present application is a Continuation In Part of U.S. patent application Ser. No. 14/067,531 filed Oct. 30, 2013, which application is incorporated in its entirety herein by reference.

BACKGROUND OF THE INVENTION

The present invention relates to chamfering ammunition case mouths and in particular to a camfer tool usable in a motorized adjustable precision micrometer case trimmer.

Ammunition cases are generally the most expensive component of ammunition. Many shooting enthusiasts reuse the cases to save money. While such cases may be capable of multiple uses, some cases, especially expensive high power rifle cases, are stretched in each use. When the cases are stretched, the neck of the case (the portion a bullet is seated in), becomes longer and increases the contact surface with bullet, and affects the release of the bullet when the ammunition is filed. Such changes in the release affect the velocity, and thus the consistency of the bullet at long range.

To address the case stretching, the cases are often trimmed back to the original length. Both manual and electric trimmers are known. Unfortunately, the known electric trimmers require expensive separate components for each size case. U.S. patent application Ser. No. 14/067,531 address these problems by providing a Micrometer Case Trimmer which merely requires a simple guide bearing for various cases, and a micrometer cutting depth adjustment. The '531 application is incorporated by reference above.

While the '531 application provides an excellent solution for case trimming, it does not provide easy chamfering of the case mouth, thus requiring an additional tool.

BRIEF SUMMARY OF THE INVENTION

The present invention addresses the above and other needs by providing a case mouth chamfer tool which utilizes an easily adjustable cutter holder member. The adjustable cutter holder member slides in a dovetail, is adjusted by advancing and retreating a screw, and is held in place by a set screw. The case mouth chamfer tool may be fixed to a micrometer dial threadedly engaging a barrel. A case adapter bearing is fixed to the barrel. The case mouth chamfer tool is adjusted to cut an inside chamfer and the micrometer dial is rotated to adjust the position of the case mouth chamfer tool with respect to the case adapter bearing to precisely adjust the amount of material cut from the case. The case adapter bearing is easily changed to chamfer different cases.

In accordance with one aspect of the invention, there is provided an electric case trimmer assembly having a micrometer cutting adjustment. A first cut is made intentionally leaving the case longer than intended. The case is measured, and the micrometer dial is turned a pre-determined number of lines to precisely adjust the case trimmer to trim the case to the correct length.

In accordance with another aspect of the invention, there is provided a case chamfering tool. The case chamfering tool includes a base member with a shaft and an adjustable cutter holder member having a dovetail engagement with the base member. The adjustable cutter holder is adjusted to turning a screw having threads engaging the base member and a head cooperating the adjustable cutter holder. The cutter includes three edges and the cutter may be detached and rotated to alternatively use all three of the cutting edges.

In accordance with yet another aspect of the invention, there is provided a method for chamfering cases. The method includes installing a case mouth chamfer tool in a micrometer dial of a case chamfering assembly, installing a case adapter bearing for a selected case type into a barrel of the case chamfering assembly, inserting a case of the selected case type into the case chamfering assembly, adjusting the depth of the cutter to almost touch the case mouth, adjusting the cutter laterally to trim a chamber inside the case mouth, adjusting the position of the cutter to cut a small chamfer in the case mouth, attaching the case chamfering assembly to a drill motor, and insert cases into the trimmer with the drill motor running.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
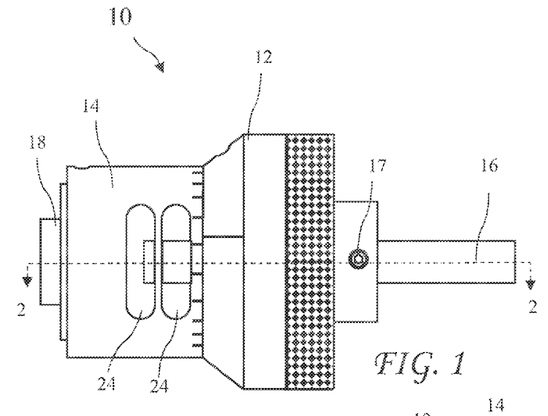
FIG. 1 is a side view of a case trimming assembly according to the present invention.
Figure 2:
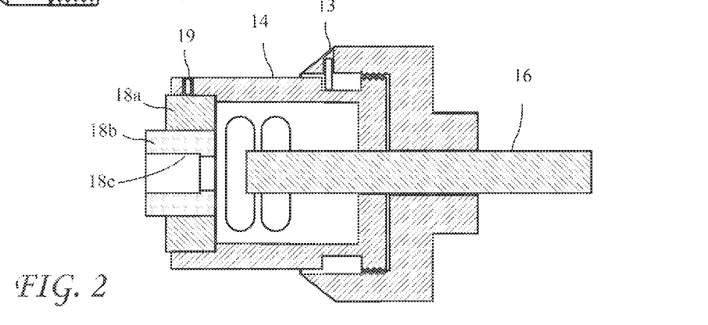
FIG. 2 is a cross-sectional view of the case trimming assembly according to the present invention taken along line 2-2 of FIG. 1.
Figure 3:
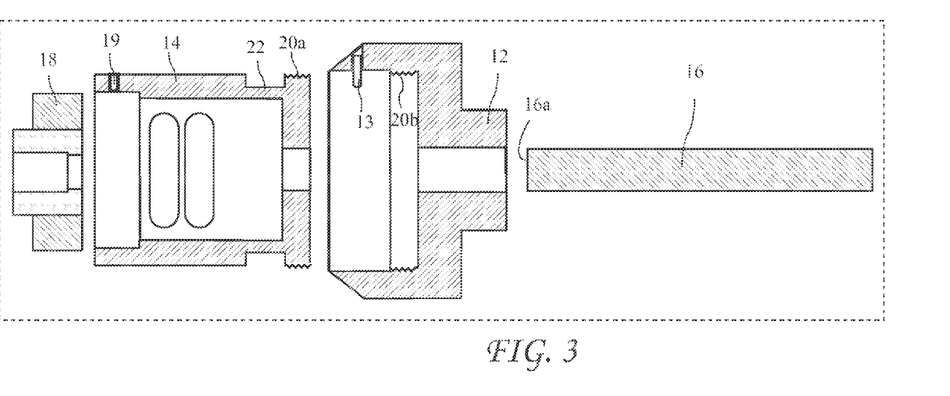
FIG. 3 is a cross-sectional view of the case trimming assembly according to the present invention separated into major components taken along line 2-2 of FIG. 1.

A side view of a case trimming assembly 10 according to the present invention is shown in FIG. 1, a cross-sectional view of the case trimming assembly 10 taken along line 2-2 of FIG. 1 is shown in FIG. 2, and a cross-sectional view of the case trimming assembly 10 separated into major components taken along line 2-2 of FIG. 1 is shown in FIG. 3. The case trimming assembly 10 includes a micrometer dial 12 (or end mill holding portion or tool holding portion), a barrel 14 (or case guiding portion), a case adapter bearing 18, and an end mill 16. The end mill 16 is fixedly attached to the micrometer dial 12 using a set screw 17 and the case adapter bearing 18 is fixedly attached to the barrel 14 by a set screw 19. The end mill 16 includes a cutting face 16a for trimming cases. The end mill 16 and case adapter bearing are coaxial with the micrometer dial 12.

The barrel 14 threadedly engages the micrometer dial 12 by threads 20a and 20b, and a third set screw 13 engages a notched ring 22 of the barrel 14. The end mill 16 is fixedly attached to the micrometer dial 12 and turning the micrometer dial 12 on the barrel 16 advances and retreats the end mill 16 with respect to the barrel 14. The case adapter bearing 18 includes an outer race 18a fixedly attached to the barrel by the set screw 19 and a rotating inner race 18b having an inner case contour 18c. The inner case contour 18c is configured for one or more cases 30 (see FIG. 4) and limits the distance a case 30 can be inserted into the barrel 14. The set screw 13 serves two purposes. The set screw 13 is tightened against the barrel 14 to fix the position of the micrometer dial for repeated trimming, and during adjustment, the set screw 13 contacts sides of the notched ring 22 to limit adjustment of the micrometer ring 12 on the barrel 14.

Figure 4:
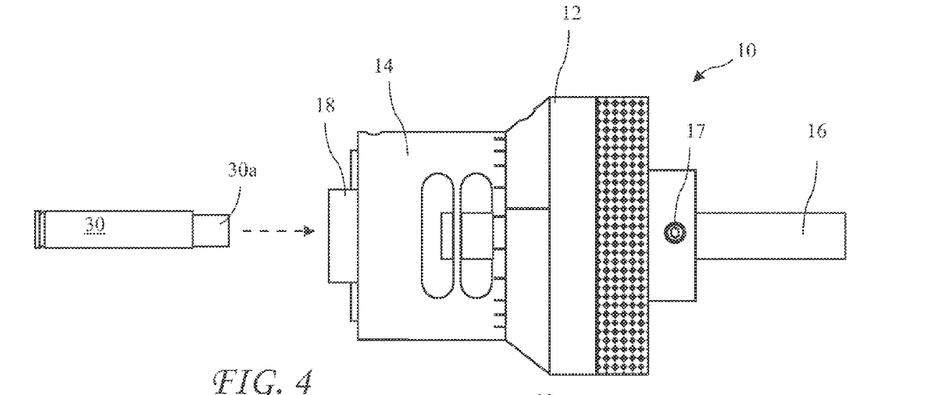
FIG. 4 is a side view of the case trimming assembly according to the present invention with a case ready for insertion into the case trimming assembly.
Figure 5:
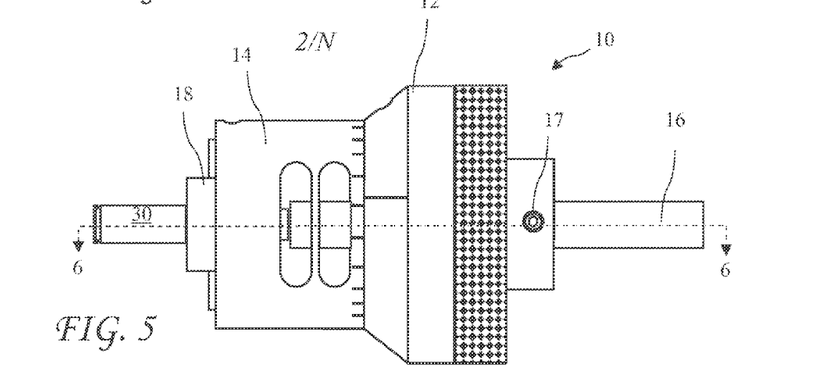
FIG. 5 is a side view of the case trimming assembly according to the present invention with the case in the case trimming assembly.
Figure 6:
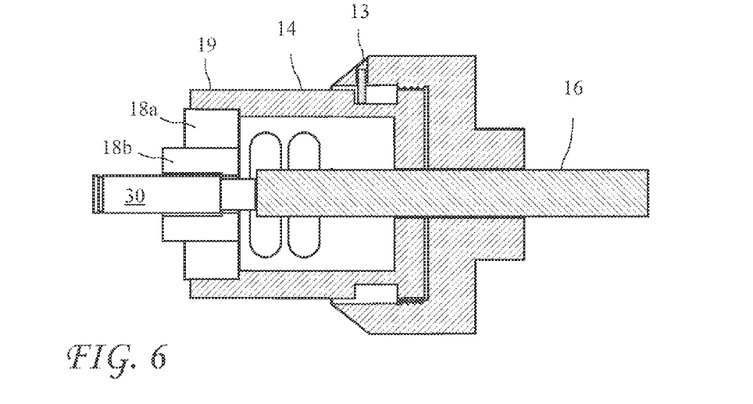
FIG. 6 is a cross-sectional view of the case trimming assembly according to the present invention with the case in the case trimming assembly taken along line 6-6 of FIG. 5.

A side view of the case trimming assembly 10 with a case 30 ready for insertion into the case trimming assembly 10 is shown in FIG. 4, a side view of the case trimming assembly 10 with the case 30 in the case trimming assembly 10 is shown in FIG. 5, and a cross-sectional view of the case trimming assembly 10 with the case 30 in the case trimming assembly 10 taken along line 6-6 of FIG. 5 is shown in FIG. 6. Windows 24 allow viewing the contact of case 30 with the end mill 16 and allows trimmed material to escape from the barrel 14. The case 30 is manually inserted by a user until the case 30 rests against the inner case contour 18c of the case adapter bearing 18. When the case mouth 30a encounters the end mill cutting face 16a before the case 30 is seated against the inner case contour 18c, material is cut from the case mouth 30a until further advance of the case 30 into the barrel is stopped by the inner case contour 18c.

Figures 7, 8A:
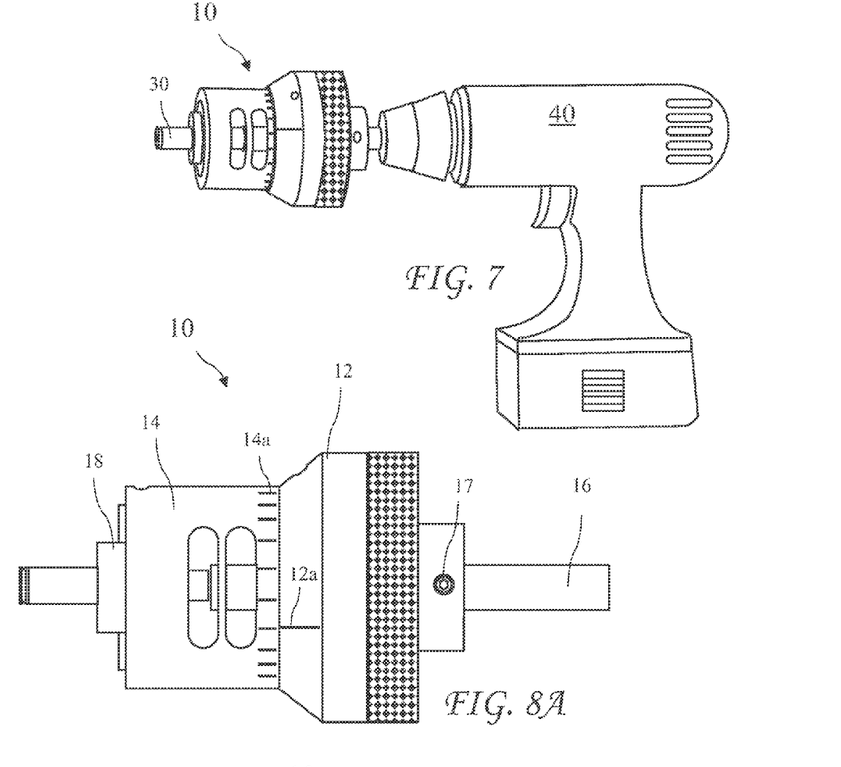
FIG. 7 is a side view of the case trimming assembly according to the present invention attached to a drill motor.
FIG. 8A is a side view of the case trimming assembly according to the present invention with the case in the case trimming assembly for a first cut before precision adjustment.

A side view of the case trimming assembly 10 attached to a drill motor 40 is shown in FIG. 7. The entire case trimming assembly 10, with only the exception of the rotating inner race 18b of the case adapter bearing 18, is rotated by the drill motor 40. The user holds the case 30 and inserts the case 30 into the rotating case trimming assembly 10.

Figure 8B:
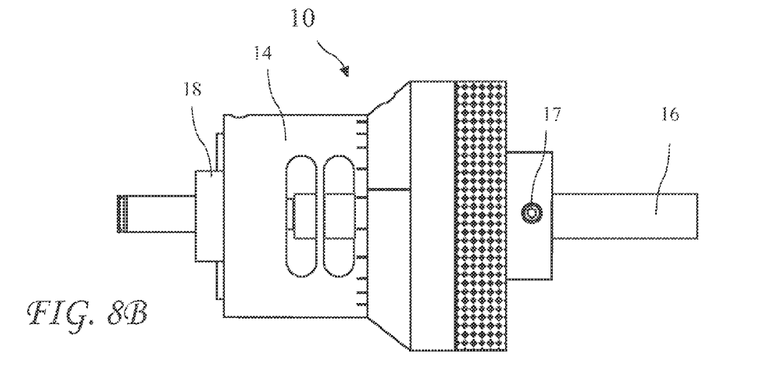
FIG. 8B is a side view of the case trimming assembly according to the present invention with the case in the case trimming assembly for second and latter cuts after precision adjustment.

A side view of the case trimming assembly 10 with the case 10 in the case trimming assembly 10 for a first cut before precision adjustment is shown in FIG. 8A and a side view of the case trimming assembly 10 with the case 30 in the case trimming assembly 10 for second and later cuts after precision adjustment is shown in FIG. 8B. The first cut is made with the micrometer dial turned counter clockwise as far as possible, but turned back clockwise to align a dial mark 12a with a closest barrel mark 14a. There is preferably a single dial mark 12a and preferably a multiplicity of evenly spaced apart barrel marks 14a. The number of barrel marks may vary, but a relationship between the angular spacing of the barrel marks 14a and the threads 20a and 20b (see FIG. 3) is preferably known and used as a basis for adjusting the micrometer dial 12 on the barrel 14. For example, in a preferred embodiment, turning the micrometer dial 12 to align the dial mark 12a with and adjacent barrel mark 14a, advances or retreats the micrometer dial 12 0.002 inches on the barrel 14.

After making a first cut, the length of the trimmed case 30 is measured, and the micrometer dial is adjusted on the barrel to provide the desired precision cut.

Figure 9:
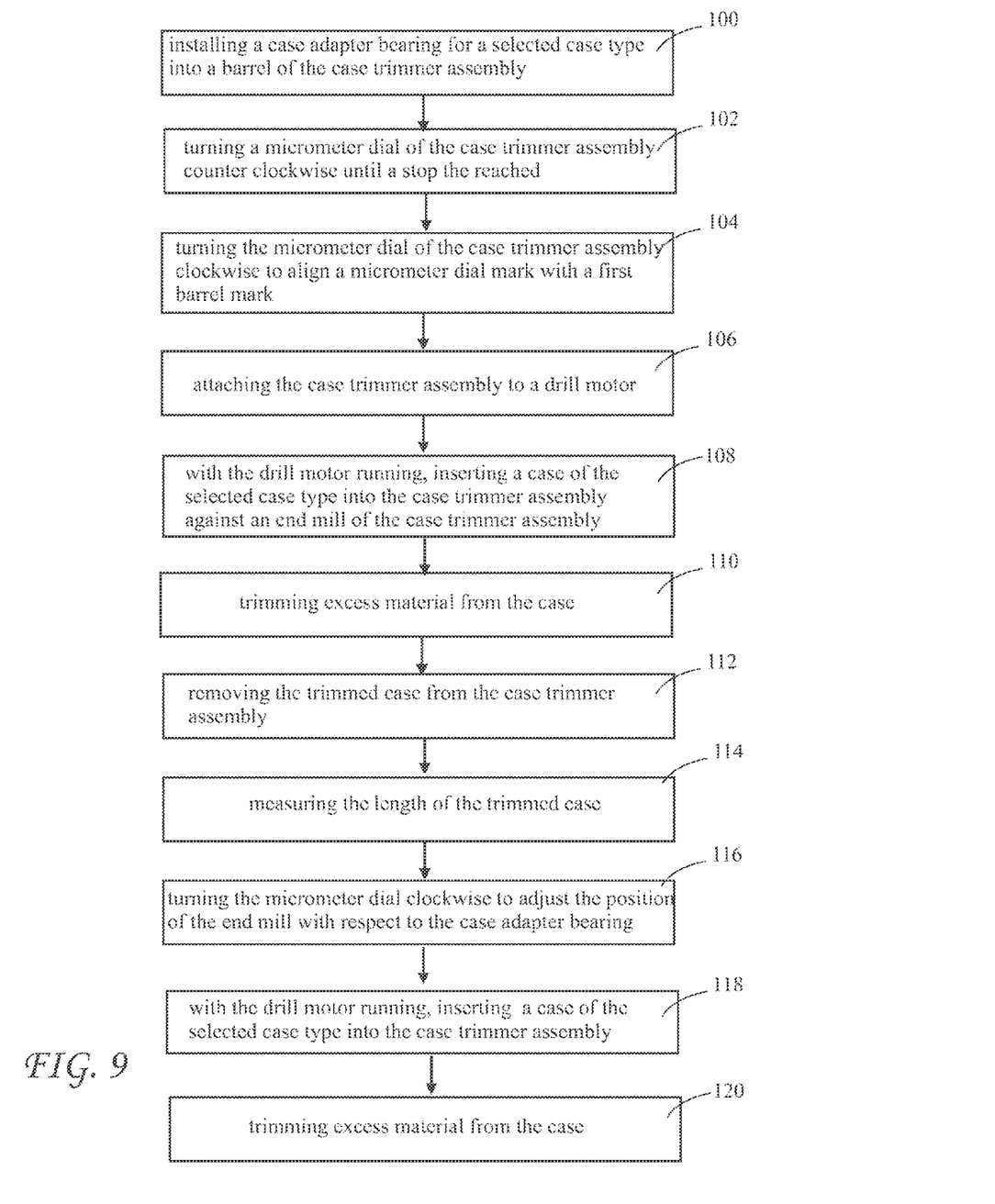
FIG. 9 is a method according to the present invention.

FIG. 9 is a method according to the present invention. The method includes installing a case adapter bearing for a selected case type into a barrel of the case trimmer assembly at step 100, turning a micrometer dial of the case trimmer assembly counter clockwise until a stop is reached at step 102, turning the micrometer dial of the case trimmer assembly clockwise to align a micrometer dial mark with a first barrel mark at step 104, attaching the case trimmer assembly to a drill motor at step 106, with the drill motor running, inserting a case of the selected case type into the case trimmer assembly against an end mill of the case trimmer assembly at step 108, trimming excess material from the case at step 110, removing the trimmed case from the case trimmer assembly at step 112, measuring the length of the trimmed case at step 114, turning the micrometer dial clockwise to adjust the position of the end mill with respect to the case adapter bearing at step 116, with the drill motor running, inserting a case of the selected case type into the case trimmer assembly at step 118, and trimming excess material from the case at step 120.

Figure 10A:
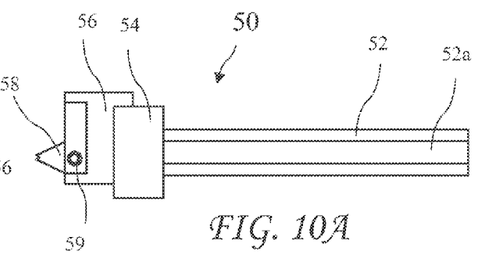
FIG. 10A shows a left side view of a case mouth chamfer tool according to the present invention.
Figure 10B:
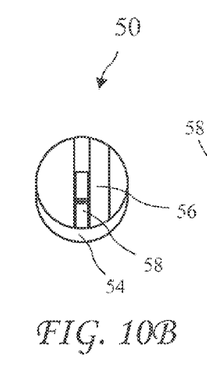
FIG. 10B shows a top view of the case mouth chamfer tool according to the present invention.
Figure 10C:
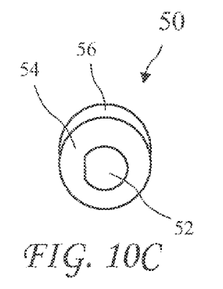
FIG. 10C shows a bottom view of the case mouth chamfer tool according to the present invention.
Figure 10D:
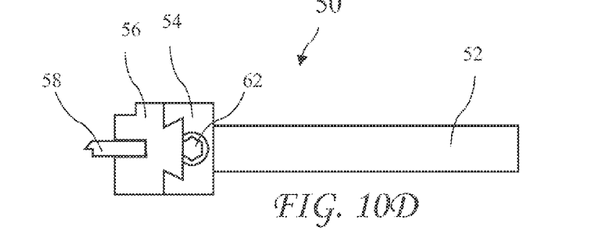
FIG. 10D shows a front view of the case mouth chamfer tool according to the present invention.
Figure 10E:
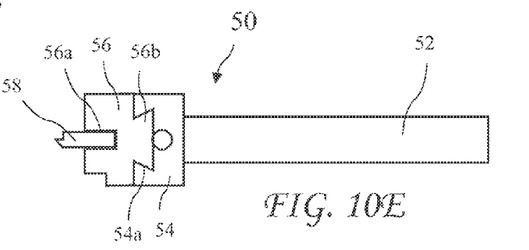
FIG. 10E shows a rear view of the case mouth chamfer tool according to the present invention.
Figure 10F:
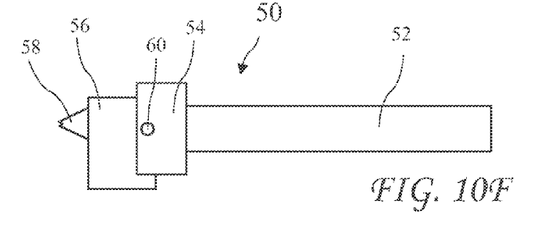
FIG. 10F shows a right side view of the case mouth chamfer tool according to the present invention.

A left side view of a case mouth chamfer tool 50 according to the present invention is shown in FIG. 10A, a top view of the case mouth chamfer tool 50 is shown in FIG. 10B, a bottom view of the case mouth chamfer tool 50 is shown in FIG. 10C, a front view of the case mouth chamfer tool 50 is shown in FIG. 10D, a rear view of the case mouth chamfer tool 50 is shown in FIG. 10E, and a right side view of the case mouth chamfer tool 50 is shown in FIG. 10F. The case mouth chamfer tool 50 holds a cutter 58 used to chamfer mouths of ammunition cases. The cutter is held in a groove 56a in the top of an adjustable cutter holder member 56. A set screw 59 is tightened against the cutter 58 to hold the cutter in the groove 56a. The adjustable cutter holder member 56 includes a dovetail base 56b which slides in a dovetail slot 54a in a base member 54 and is adjusted by turning a screw 62 engaging both the base member 54 and the adjustable cutter holder member 56. The adjustable cutter holder member 56 is held in position after adjustment by a second set screw 60 in the base member 54. The base member 54 includes a shaft 52 having a flat 52a. The case trimmer assembly 10 (see FIG. 1) may be converted to chamfer case mouths by replacing the end mill 16 with the case mouth chamfer tool 50, held in place by the set screw 17.

Figure 11A:
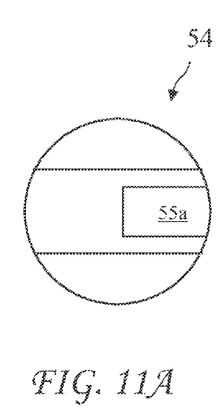
FIG. 11A shows a top view of a base member of the case mouth chamfer tool according to the present invention.
Figure 11B:
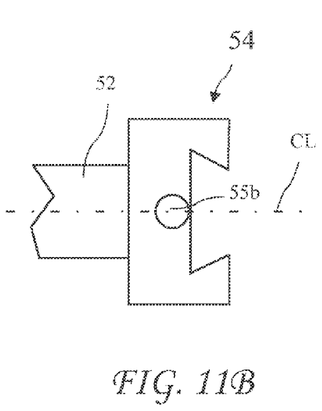
FIG. 11B shows a rear view of the base member of the case mouth chamfer tool according to the present invention.
Figure 11C:
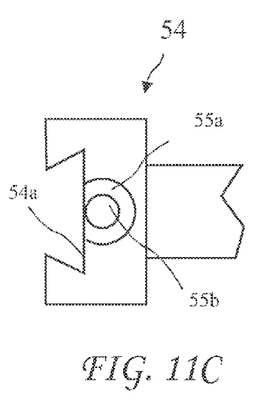
FIG. 11C shows a front view of the base member of the case mouth chamfer tool according to the present invention.

A top view of a base member 54 is shown in FIG. 11A, a rear view of the base member 54 is shown in FIG. 11B, and a front view of the base member 54 is shown in FIG. 11C. The base member 54 includes a small female threaded passage 55b and a larger unthreaded passage 55a. The passages 55a and 55b are coaxial and sequential, the passage 55a reaching from the exterior about half way into the base member 54, and passage 55b continuing through the base member 54. The top of the passage 55a opens into the dove tale slot 54a. The base member 54 and shaft 52 share a centerline CL. The dovetail slot 54a is preferably perpendicular to the centerline CL.

Figure 12A:
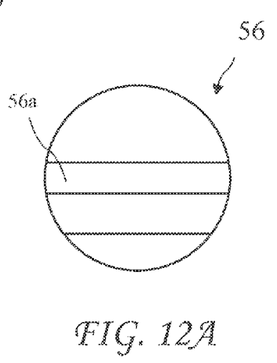
FIG. 12A shows a top view of an adjustable cutter holder member of the case mouth chamfer tool according to the present invention.
Figure 12B:
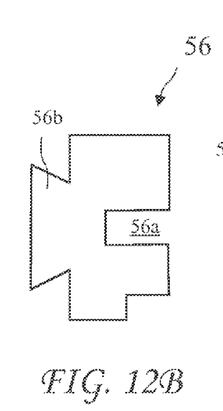
FIG. 12B shows a rear view of the adjustable cutter holder member of the case mouth chamfer tool according to the present invention.
Figure 12C:
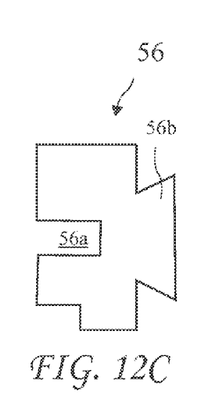
FIG. 12C shows a front view of the adjustable cutter holder member of the case mouth chamfer tool according to the present invention.
Figure 12D:
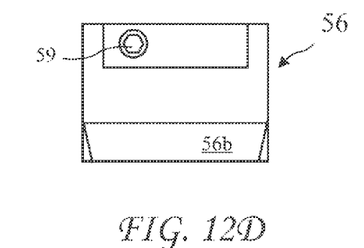
FIG. 12D shows a left side view of the adjustable cutter holder member of the case mouth chamfer tool according to the present invention.

A top view of an adjustable cutter holder member 56 is shown in FIG. 12A, a rear view of the adjustable cutter holder member 56 is shown in FIG. 12B, a front view of the adjustable cutter holder member 56 is shown in FIG. 12C, and a left side view of the adjustable cutter holder member 56 is shown in FIG. 12D.

Figure 13A:
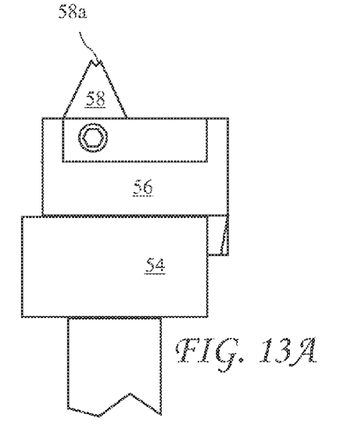
FIG. 13A shows a left side view of the adjustable cutter holder member attached to the base member in a first cutting position according to the present invention.
Figure 13B:
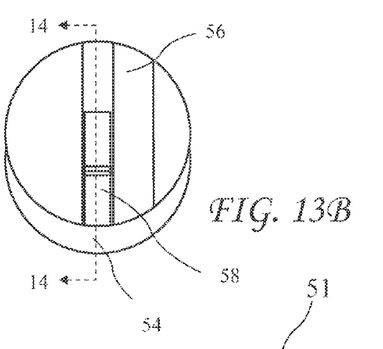
FIG. 13B shows a top view of the adjustable cutter holder member attached to the base member in a first cutting position according to the present invention.
Figure 14A:
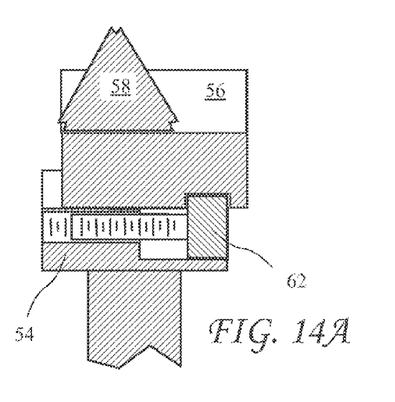
FIG. 14A shows a cross-sectional side view of the adjustable cutter holder member attached to the base member in the first cutting position according to the present invention taken along line 14-14 of FIG. 13B.
Figure 14B:
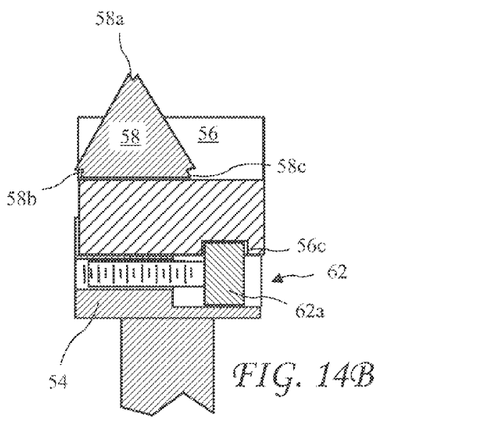
FIG. 14B shows a cross-sectional side view of the adjustable cutter holder member attached to the base member in a second cutting position according to the present invention taken along line 14-14 of FIG. 13B.

A left side view of the adjustable cutter holder member 56 attached to the base member 54 in a first cutting position is shown in FIG. 13A, a top view of the adjustable cutter holder member 56 attached to the base member 54 in the first cutting position is shown in FIG. 13B, a cross-sectional side view of the adjustable cutter holder member 56 attached to the base member 54 in the first cutting position taken along line 14-14 of FIG. 13B is shown in FIG. 14A, and a cross-sectional side view of the adjustable cutter holder member 56 attached to the base member 54 in a second cutting position taken along line 14-14 of FIG. 13B is shown in FIG. 14B. A screw 62 engages threads in the passage 55b and a head 62a of the screw 62 partially resided in a recess 56c in the bottom of the adjustable cutter holder member 56. Thus turning the screw 62, advances or retreats the screw 62 into the base member 54, and also translates the adjustable cutter holder member 56 with respect to the base member 54, thereby adjusting the position of the cutter 58. The set screw 60 (see FIG. 10F) holds the position of the adjustable cutter holder member 56.

The cutter 58 includes three cutting edges 58a, 58b, and 58c, and the cutter 58 may be detached and rotated to alternatively use all three of the cutting edges. The cutting edges are angled to cut the chamber in the case mouth.

Figure 15:
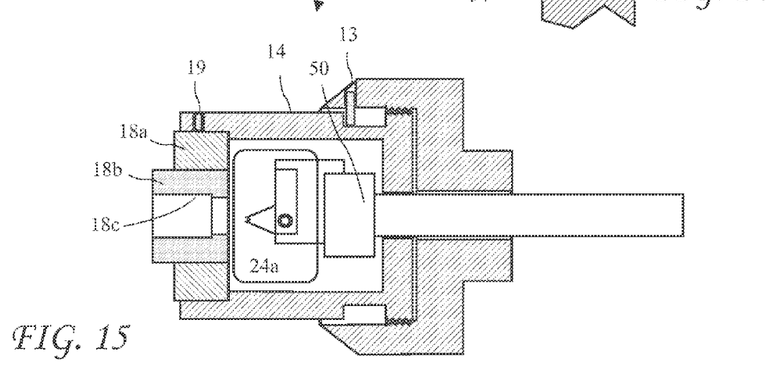
FIG. 15 shows a case chamfering assembly according to the present invention.

A case chamfering assembly 51 is shown in FIG. 15. The case chamfering assembly 51 is a combination of the case trimming assembly 10, replacing the end mill 16 with the case chamfering tool 50. The barrel 14 may include a large window 24a allowing easier lateral adjustment of the cutter 58. When assembled, the windows in the barrel 14 allow access to the screw 68 to laterally adjust the cutter 58 and to the set screw 59 to hold the position of the cutter 58.

Figure 16:
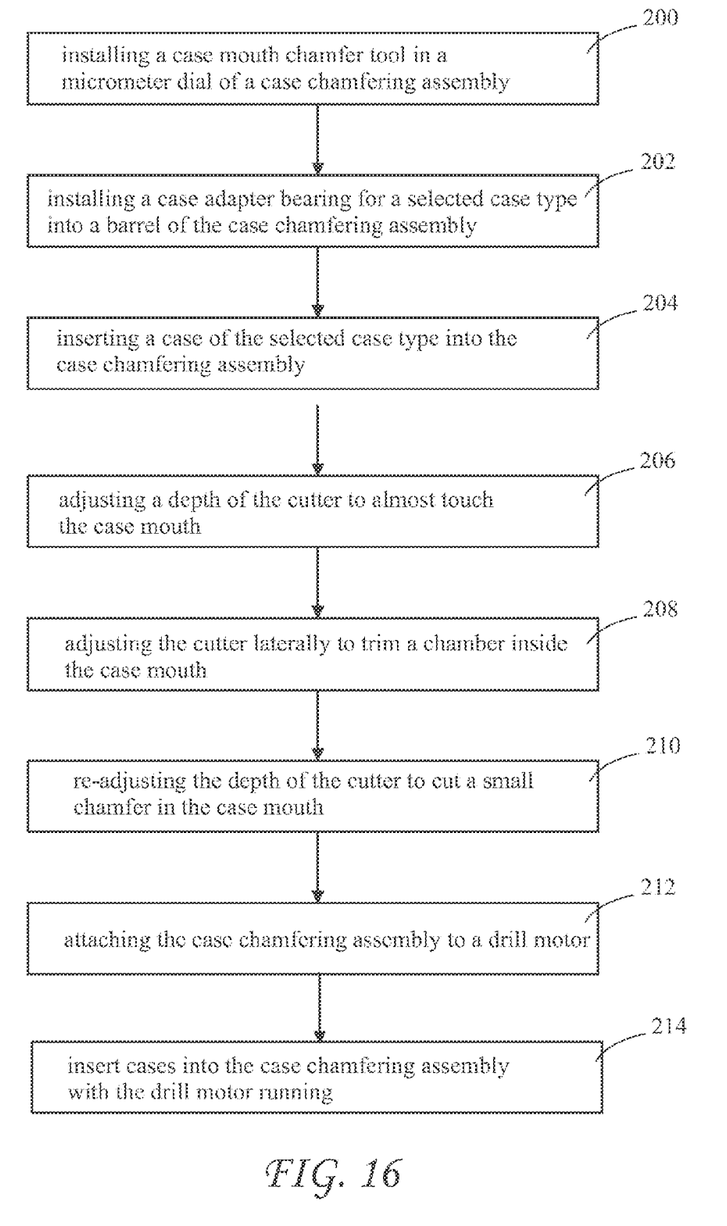
FIG. 16 describes a method for chamfering case mouths according to the present invention.

A method for chamfering case mouths according to the present invention is described in FIG. 16. The method includes installing a case mouth chamfer tool in a micrometer dial of a case chamfering assembly at step 200, installing a case adapter bearing for a selected case type into a barrel of the case chamfering assembly at step 202, inserting a case of the selected case type into the case chamfering assembly at step 204, adjusting a depth of the cutter to almost touch the case mouth at step 206, adjusting the cutter laterally to trim a chamber inside the case mouth at step 208, adjusting the position of the cutter to cut a small chamfer in the case mouth at step 210, attaching the case chamfering assembly to a drill motor at step 210, and insert cases into the case chamfering assembly with the drill motor running at step 212. Step 208 may further include turning a barrel of the case chamfering assembly to align windows in the barrel with a cutter lateral adjustment screw and a cutter holding set screw.

While the invention herein disclosed has been described by means of specific embodiments and applications thereof, numerous modifications and variations could be made thereto by those skilled in the art without departing from the scope of the invention set forth in the claims.

I claim:

1. A case chamfering tool, comprising:
   a base member having a centerline (CL);
   an adjustable cutter holding member slidably engaging the base member;
   a screw cooperating with the base member and the adjustable cutter holding member to translate the adjustable cutter holding member with respect to the base member;
   a cutter held by the adjustable cutter holding member, the cutter including at least one cutting edge angled with respect to the base member centerline and configured for chamfering a case mouth;
   a shaft extending from the base member opposite to the cutter and co-axial with the centerline (CL);
   the shaft attached to a tool holding portion; and
   a case guiding portion configured to axially restrain the case and adjustably cooperating with the tool holding portion to adjust a separation of a case mouth of a case inserted into the case guiding portion from the cutter of the chamfering tool.

2. The chamfering tool of claim 1, wherein the cooperation of the screw comprises threaded cooperation with the base member and cooperation between a head of the screw and a recess in the adjustable cutter holding member to translate the adjustable cutter holding member with respect to the base member.

3. The chamfering tool of claim 2, wherein the adjustable cutter holding member slidably engages the base member in a dovetail engagement.

4. The chamfering tool of claim 3, wherein the screw has a cylindrical head which partially resides in a recess in a dovetail base of the adjustable cutter holding member.

5. The chamfering tool of claim 1, wherein the cutter is a triangular cutter having three cutting edges.

6. The chamfering tool of claim 5, wherein the cutter resided in a slot in the adjustable cutter holding member and is held in position by a set screw.

7. The chamfering tool of claim 1, further including
a removable and replaceable case adapter bearing attached to the case guiding portion, the case adapter including an inner case contour configured to limit insertion of the case into the case guiding portion, and aligned to present a case mouth of the case inserted into the inner case contour, to the cutter of the chamfering tool to chamfer the case mouth.

8. The chamfering tool of claim 7, wherein: the adjustable cooperation of the tool holding portion with the case guiding portion comprises threaded cooperation of the tool holding portion with the case guiding portion and rotating the case guiding portion with respect to the case guiding portion adjusts the separation of the inner case contour from the cutting face of the chamfering tool.

9. The chamfering tool of claim 8, wherein cooperating angular position indicia is present on the case guiding portion and on the tool holding portion to show a user how much the separation of the inner case contour from the cutting face of the chamfering tool is changed when the case guiding portion is rotated with respect to the case guiding portion.

10. The chamfering tool of claim 8, wherein;
the case guiding portion includes a notched ring on an exterior of the case guiding portion;
the tool holding portion overlaps the notched ring;
a radially aligned set screw threadedly engages the tool holding portion and reached into the notched ring; and
the set screw limits the adjustment of the separation of the inner case contour from the cutting face of the chamfering tool and fixes the separation of the inner case contour from the cutting face of the chamfering tool when tightened against the case guiding portion.

11. The chamfering tool of claim 8, wherein the tool holding portion includes windows providing access to a cutter adjustment screw and to a cutter holding set screw.

12. The chamfering tool of claim 7, wherein separate case adapter bearings are provided for difference shaped cases.

13. A case chamfering tool comprising:
a micrometer dial;
a case chamfering tool fixedly attachable to and detachable from the micrometer dial;
a case adapter bearing having an inner race including an inner case contour configured to limit the advance of a case into the case adapter bearing, wherein different case adapter bearings are provided for difference shaped cases;
a barrel, the case adapter bearing fixedly attachable to the barrel and detachable from the barrel, the barrel threadedly cooperating with the micrometer dial to adjust a separation of the inner case contour of the case adapter bearing from a cutting face of the chamfering tool;
a notched circumferential ring on an exterior of the barrel, wherein:
the micrometer dial overlaps the notched circumferential ring;
a radially aligned set screw threadedly engages the micrometer dial reached into the notched circumferential ring; and
the set screw limits the adjustment of the separation of the inner case contour from the cutting face of the chamfering tool and fixes the separation of the inner case contour from the cutting face of the chamfering tool when tightened against the barrel; and
a multiplicity of uniformly angularly spaced apart barrel marks on the barrel and dial mark on the micrometer dial proximal to the barrel marks, the angular spacing of the barrel marks corresponding to a change in the separation of the inner case contour of the case adapter bearing from a cutting face of the chamfering tool.

14. A method for chamfering a case mouth, the method comprising:
installing a case mouth chamfer tool into a micrometer dial of a case chamfering assembly;
installing a case adapter bearing for a selected case type into a barrel of the case chamfering assembly;
inserting a case of the selected case type into the case chamfering assembly;
adjusting a depth of the cutter to almost touch the case mouth;
adjusting the cutter laterally to trim a chamber inside the case mouth;
re-adjusting the depth of the cutter to cut a small chamfer in the case mouth;
attaching the case chamfering assembly to a drill motor;
with the drill motor running, inserting a case of a selected case type into a case adapter bearing of the case chamfering assembly against the cutter of the chamfer tool;
trimming a chamfer in the mouth of the case; and
removing the chamfered case from the case chamfering assembly.

15. The method of claim 14, wherein adjusting a depth of the cutter to almost touch the case mouth comprises:
visually observing the depth of the case mouth chamfer tool in the case chamfering assembly;
adjusting the depth to position a cutter of the case mouth chamfer tool proximal to the case mouth; and
tightening a set screw against a shaft of the case mouth chamfer tool to hold the position of the case mouth chamfer tool in the case chamfering assembly.

16. The method of claim 14, wherein re-adjusting the depth of the cutter to cut a small chamfer in the case mouth comprises turning the micrometer dial of the case chamfering assembly with respect to the barrel.

17. The method of claim 14, further including turning the barrel of the case chamfering assembly to align windows in the barrel with a cutter lateral adjustment screw and a cutter holding set screw.

18. The method of claim 14, further including after installing the case mouth chamfer tool into the micrometer dial, engaging the micrometer dial with the barrel of the case chamfering assembly.

* * * * *